United States Patent [19]

Jardin et al.

[11] 4,312,533
[45] Jan. 26, 1982

[54] SLIDING ROOF FOR MOTOR VEHICLES

[75] Inventors: Hans Jardin, Inning; Walter Schätzler, Gauting; Werner Sielk, Erftstadt-Lechenich, all of Fed. Rep. of Germany

[73] Assignee: Webasto-Werk W. Baier GmbH and Co., Munich, Fed. Rep. of Germany

[21] Appl. No.: 158,362

[22] Filed: Jun. 11, 1980

[30] Foreign Application Priority Data

Jun. 13, 1979 [DE] Fed. Rep. of Germany ....... 2923888

[51] Int. Cl.³ .............................................. B60J 7/10
[52] U.S. Cl. ................................... 296/214; 296/215; 296/222; 49/163; 49/168
[58] Field of Search ............... 296/214, 215, 216, 222; 49/163, 168

[56] References Cited

U.S. PATENT DOCUMENTS

| 2,193,607 | 3/1940 | Votypka | 296/222 |
| 3,964,787 | 6/1976 | Prechter | 296/215 |
| 4,175,784 | 11/1979 | Schatzler | 296/214 |
| 4,257,646 | 3/1981 | Schatzler | 296/222 |

Primary Examiner—Robert R. Song
Attorney, Agent, or Firm—Craig and Antonelli

[57] ABSTRACT

A sliding roof assembly for motor vehicles of the type having a translucent, rigid sliding cover that closes a roof opening of a fixed roof part in a closed position and is lowerable down and out of the opening and is slidable behind a rear roof part in an open position as well as a sliding headlining that is slidable independently of the sliding cover and jointly therewith is improved in accordance with the present invention by the construction of guide channels for the sliding headlining by surfaces of a U-shaped shield connected to the sliding cover and a portion of an upper surface of lateral tracks used to guide the sliding cover.

14 Claims, 9 Drawing Figures

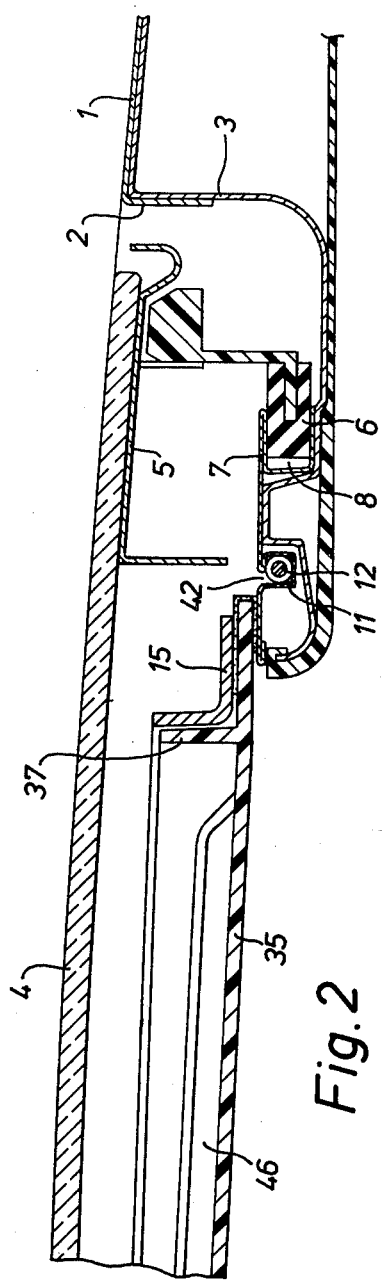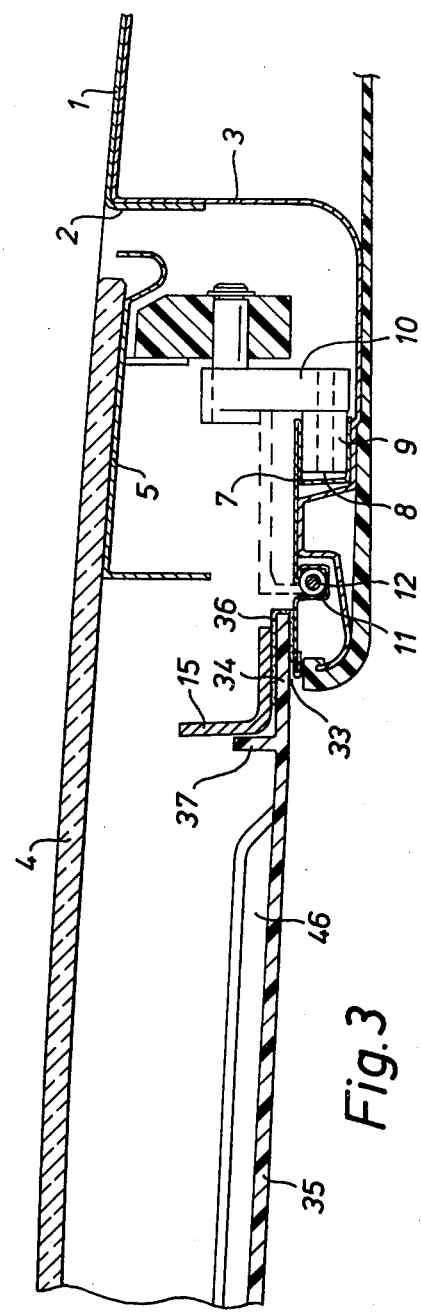

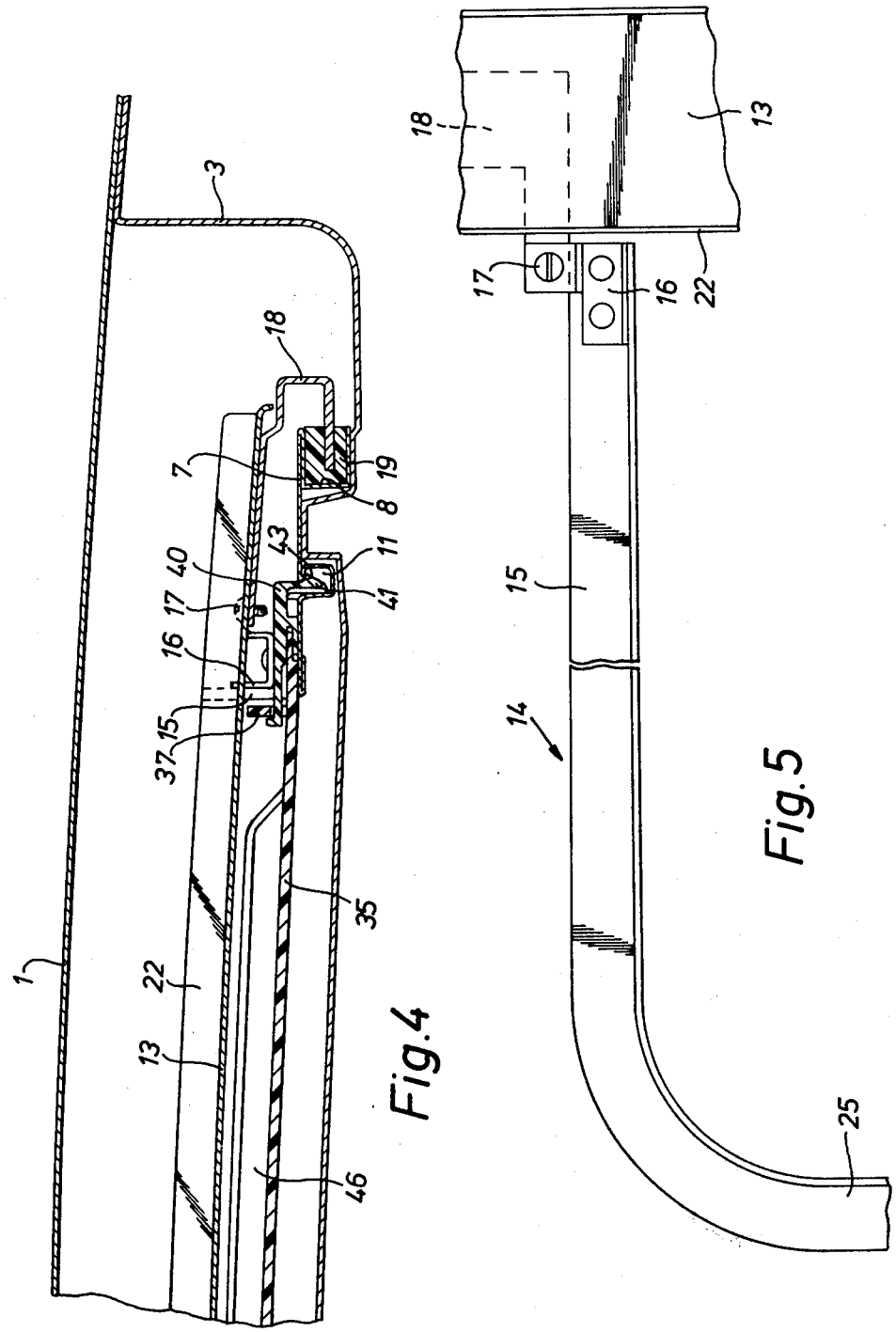

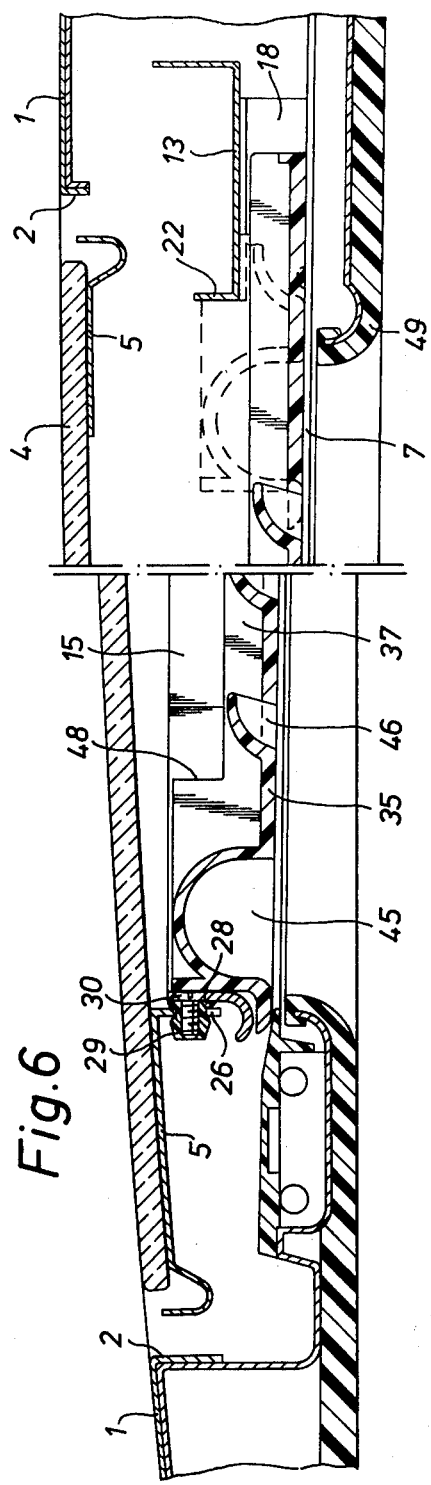
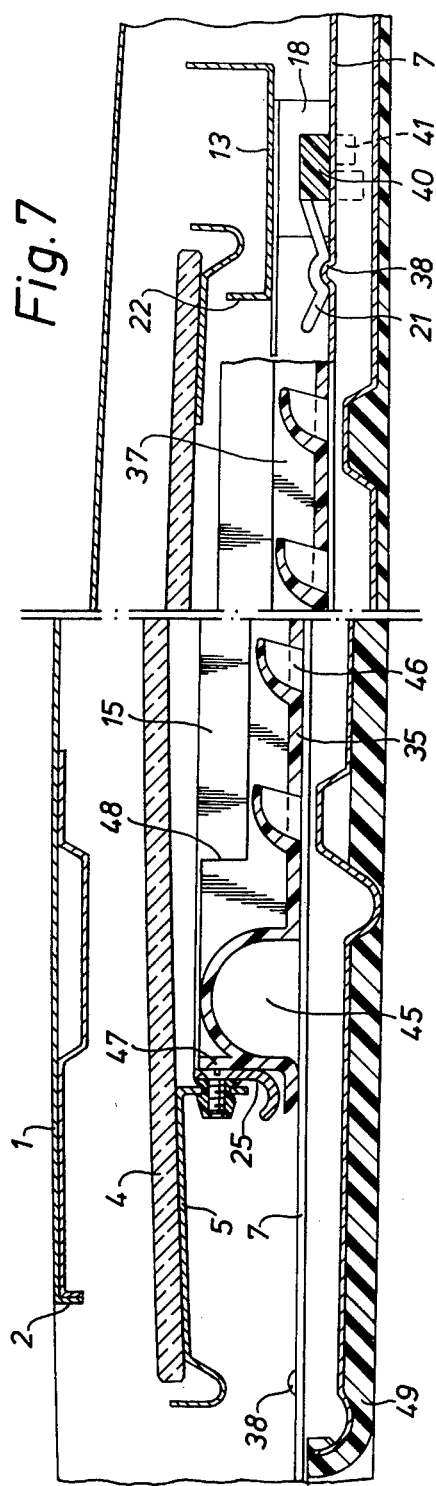

SLIDING ROOF FOR MOTOR VEHICLES

BACKGROUND AND SUMMARY OF THE INVENTION

The invention relates to a sliding roof, especially a tilting and sliding roof, for motor vehicles, with a translucent, rigid sliding cover, said cover closing a roof opening in its closed position, and being lowerable from this opening and slidable beneath the fixed rear roof part, lateral tracks being mounted on the fixed roof part to guide the sliding cover and/or to form cable channels, an approximately U-shaped shield running along lateral edges and forward edge of the sliding cover being displaceable together with the sliding cover, and an independently slidable sliding headlining, covering the sliding cover in the closed position.

In a known sliding roof of this type (German Pat. No. 2,502,775) additional tracks are provided to guide the sliding headlining on the sliding roof frame. The lateral legs of the shield engage a guide channel which is formed by these additional tracks and projecting parts of the tracks of the sliding cover. The shield covers the functional parts for displacement of the sliding cover when the sliding cover is closed and the sliding headlining is slid back. Moreover, when the sliding cover is closed, the entrance of light can be regulated at will. The known sliding roof, however, has a relatively costly design.

Additionally, this application represents further developments of the invention disclosed in commonly assigned U.S. Patent Application Ser. No. (16912) filed by Walter Schatzler on even date under the same title as the present application.

An object of the present invention is to further simplify the design and installation of a sliding roof, while retaining all of the functional advantages of the known sliding roof.

This object is achieved according to a preferred embodiment of the invention by virtue of the fact that the lateral legs of the shield, together with at least a part of the upper surface of the tracks, delimit guide channels for the lateral edges of the sliding headlining.

In this fashion, additional tracks for the shield and/or the sliding headlining are avoided. Only those tracks are required which would be present in any case, in order to guide the sliding rood and/or to accept the incompressible cables, by means of which the sliding cover is displaced. In this way, not only is the total number of structural elements required reduced, but a considerable simplification of installation is achieved as well. The shield can be made of one or more parts. It can be made of metal, especially aluminum, or from plastic.

In order to avoid lateral deflection of the sliding headlining, the sliding headlining is preferably provided with upwardly projecting rub rails, which can also serve for lateral guidance of the sliding headlining in conjunction with lateral legs of the shield.

In another embodiment of the invention, the lateral edges of the sliding headlining are provided with a flexible coating, advantageously in the form of a flocked strip glued to these lateral edges. Providing such a coating reliably prevents rattling noises coming from the headlining in the vicinity of the lateral edges of the sliding headlining guided between the shield and the tracks. The sliding headlining moves easily and silently. The flexible coating also provides a slight frictional effect, so that the sliding headlining will remain in position even in intermediate positions, something which is especially important when accelerating or braking the vehicle.

In order to ensure reliable guidance of the sliding headlining even when the sliding cover and the shield with it are at the front, while the sliding headlining has been pushed back, the sliding headlining, in another embodiment of the invention, has projections that extend rear-ward and downward, and engage the lateral cable channels. These projections can be formed directly on the sliding headlining. Preferably, however, these projections are formed of parts which provide spring tension, and are fastened by clips to the sliding headlining. An especially simple design is achieved when the projections on the sliding headlining fit under spring tension through slots in the tops of the cable channels, into said cable channels. According to a modified embodiment, the sliding headlining can be provided at its rear end on both sides with a sliding angle, which is guided in a sliding-shoe channel formed by the tracks.

Undesirable displacements of the sliding headlining, for example, under the influence of acceleration and deceleration, can easily be avoided by providing a locking arrangement for releasable holding of the sliding headlining, at least in the closed position and the fully open position of the sliding headlining. In this way, the locking of the headlining can be accomplished optionally with the shield or with the tracks.

For reliable engagement of the shield during displacement movements of the sliding cover, the shield can be connected advantageously at the front and/or above the rear ends of its lateral legs with the sliding cover. For this purpose, parts can be provided at the rear ends of the lateral legs of the shield which are releasably connected with a gutter that participates in the displacement movements of the sliding cover. Hence, a simple guidance of the shield in its rear area is simultaneously ensured, whereby preferably the rear ends of the lateral shield legs are protected against lateral movement at the gutter.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is a partial cross section through the forward part of the sliding roof along line II—II in FIG. 1;

FIG. 3 is a partial cross section through the rear part of the sliding roof along line III—III in FIG. 1;

FIG. 4 is a partial cross section through the gutter, which moves together with the sliding cover, in the rear part of the sliding roof along line IV—IV in FIG. 1;

FIG. 5 is a partial top view of the shield and gutter;

FIG. 6 is a lengthwise section through the closed sliding roof along line VI—VI in FIG. 1;

FIG. 7 is a partial lengthwise section through the sliding roof along line VI—VI in FIG. 1, but with the roof in an open position;

DETAILED DESCRIPTION OF THE PREFERRED EMBODIMENTS

Figure 1:
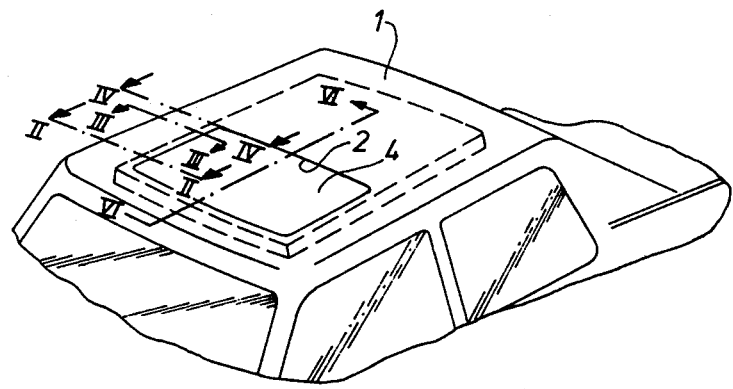
FIG. 1 is a schematic perspective partial view of a motor vehicle equipped with a tilting and sliding roof.

A roof opening 2 is formed in fixed roof part 1, said opening being enclosed by a frame 3 and being closable by a translucent, rigid sliding cover 4. The edges of sliding cover 4 are surrounded by a mounting frame 5. Sliding shoes 6 are provided on mounting frame 5 near the leading edge of sliding cover 4 on both sides, said shoes engaging a lateral track 7 mounted laterally in frame 3 (FIG. 2). In the vicinity of its rear edge, sliding cover 4 is articulated on both sides to guide slides, which are guided by sliding shoes 9 in a sliding-shoe channel 8 formed by tracks 7, and connected with mounting frame 5 by operating lever 10. The guide slides are displaceable manually or by a motor through incompressible cables 12, said cables running in cable channels 11 of tracks 7. The functioning parts for displacement and tilting of sliding cover 4 do not form any part of the present invention and therefore are not described in greater detail. They can be designed in any fashion which is conventional for an individual skilled in the art. Likewise, while the roof is shown in its closed position in FIGS. 2, 3, and 6 with a clearance gap between a free edge of mounting frame 5 and roof frame 3 in practice a sealing member, such as that shown in the present inventors' commonly assigned U.S. patent application Ser. No. (16,836), entitled "Rigid Cover For Vehicle Roofs", filed Apr. 28, 1980, is mounted on this free edge to provide a leak-proof seal between the cover 4 and frame 3 in the closed position.

A gutter 13 is provided, which participates in all of the sliding movements of sliding cover 4. Gutter 13 can be connected for this purpose by rods, not shown but known per se (see for example commonly assigned U.S. Patent application Ser. No. (16,754), filed Apr. 12, 1980, entitled "Vehicle Roof" and having common inventors) with mounting frame 5 of sliding cover 4. A shield 14, made for example of aluminum, and essentially U-shaped (FIG. 5), extends along the lateral edges and the forward edge of sliding cover 4, in order to cover the functioning parts of the sliding roof. Lateral legs 15 of the shield are riveted at their rear ends to mounting arms 16, which are releasably connected by screws 17 with sliding-shoe supports 18. Sliding shoe support 18 is spot-welded to gutter 13, and guided by a sliding shoe 19 in sliding-shoe channel 8. In this way, the shield legs are held reliably and prevented from lateral deflection.

A forward rib 25 of shield 14 is screwed to mounting frame 5 of the sliding cover 4. For this purpose, a plastic part 27 is inserted in a slot 26 on mounting frame 5, said part having a flange 28 located between rib 25 and mounting frame 5. At the end which is away from rib 25, plastic part 27 is provided with a slotted head 29, which abuts rib 25 and into which a screw 30, which passes through rib 25, is screwable. When screw 30 is tightened, head 29 is spread out in the manner of a Molly anchor, whereupon an additional clamping action is exerted on mounting frame 5.

Lateral legs 15 of shield 14, which is thereby connected with sliding cover 4, together with a part of the top of tracks 7, delimit guide channels 33.

The lateral edges 34 of a rigid sliding headlining 35, made of an opaque material, preferably plastic, run in these guide channels. The lateral edges of sliding headlining 35 are provided with a flexible coating 36, which can be formed advantageously, for example, of a flocked strip glued to the lateral edges. Coating 36 ensures a smooth, guiet operation of sliding headlining 35 between tracks 7 and legs 15 of shield 14. Laterally positioned, upwardly projecting rub rails 37 on sliding headlining 35 are arranged so that they will be closely adjacent shield legs 15 and thereby serve for lateral guidance of the headlining.

Tracks 7 are provided with at least two bumps 38 (FIG. 7), which engage the locking nose 21 of a spring-loaded part 40 when sliding headlining 35 is in the closed position or in the fully open position, in order to thereby hold the sliding headlining releasably in the corresponding position. It is understood that the sliding headlining can be locked in intermediate positions as well by providing additional bumps.

As is particularly apparent from FIGS. 4 and 7, sliding headlining 35 has at its rear end, one of parts 40 on each side, which are fastened by clips to the sliding headlining. Parts 40 are formed with downwardly projecting projections 41 in addition to locking noses 21. These projections 41 project through slots 42 in lateral cable channels 11, which are open at the top. They thereby interlock under spring tension with the cable channels and abut the upper limiting walls of the cable channels with a projecting part 43. In this way, sliding headlining 35 is reliably guided even when sliding headlining 36 is slid backward with sliding cover 4 closed (a condition whereby rub rails 37 are for the most part longitudinally displaced relative to legs 15). Projections 41 are always beneath the ends of cables 12, so that they do not interfere with their operation.

Rigid, sliding headlining 35 is provided with a recessed handle 45 in the vicinity of its forward edge. Ventilation slots 46 extend over practically the entire width of the sliding headlining.

When the sliding cover 4 assumes its closed position (FIGS. 2, 3, and 6), sliding headlining 35, guided between shield 14 and tracks 7, can move freely between the closed position shown in FIG. 6 by the solid line and an open position, indicated by dashed lines, on the right-hand side of FIG. 6. In the closed position, forward edge 47 of sliding headlining 35 abuts rib 25 on shield 14. The open position of the sliding headlining, with sliding cover 4 closed, is delimited by the fact that a stop 48 on the sliding headlining abuts leg 22 of gutter 13 (right-hand side of FIG. 6). When sliding cover 4 is open (FIG. 7), if the sliding cover 4 is moved forward from this position, gutter 13, together with its leg 22, strikes stop 48 on sliding headlining 35 and carries the latter up to the position shown on the right-hand side of FIG. 6.

Figure 8:
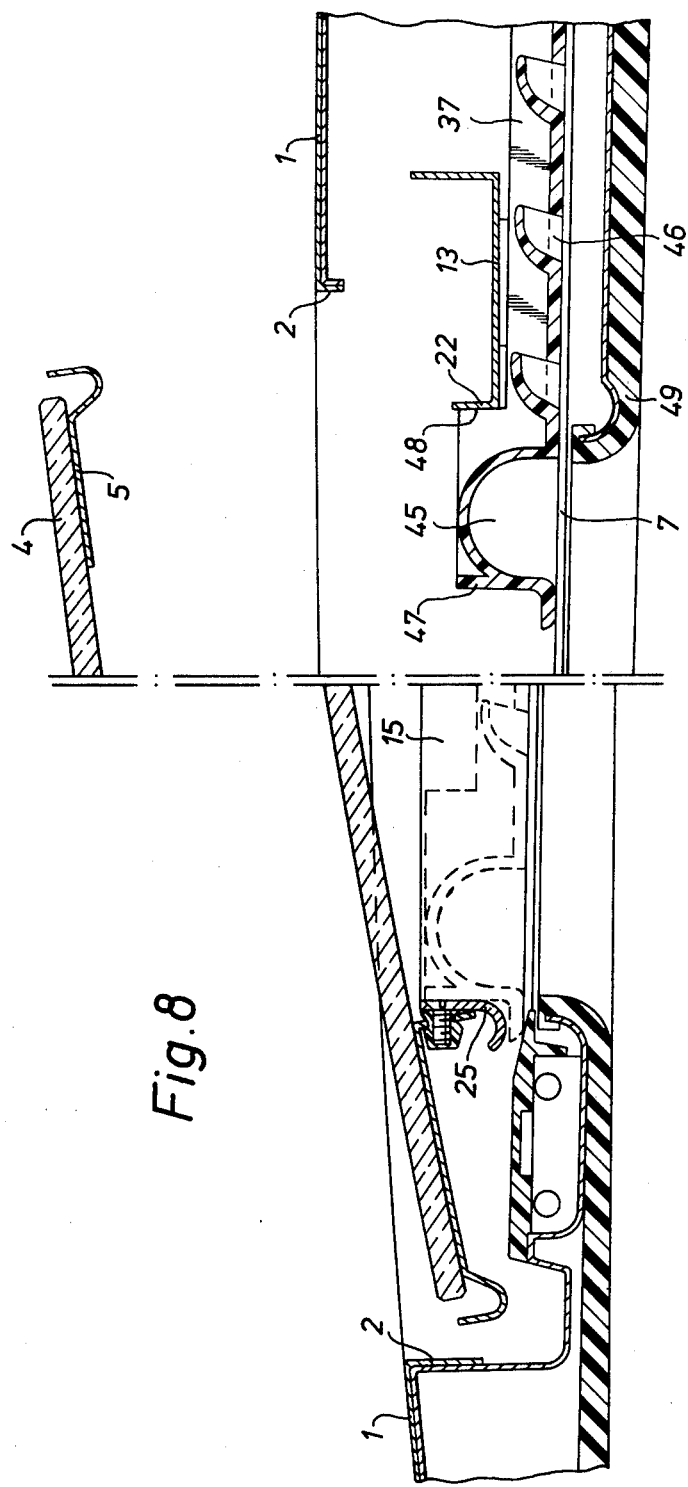
FIG. 8 is a partial lengthwise section through the sliding roof along line VI—VI in FIG. 1, but with the roof in a tilted position.

From the closed position, sliding cover 4 can also be conveyed by the functional parts (not shown) into a tilted position shown in FIG. 8. In this case, too, the sliding headlining 35, which is guided in channels 33 between tracks 7 and shield legs 15, is adjustable between the open and closed positions.

Figure 9:
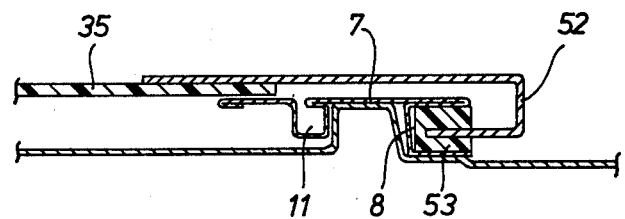
FIG. 9 is a partial cross section similar to FIG. 4 for a modified embodiment of the rear headlining guide.

In the modified embodiment shown in FIG. 9 in addition to the headlining being guided between legs 15 of shield 14 and the top of track 7, a sliding angle arm 52 is provided on each side at the rear end of sliding headlining 35, said angle arm having a sliding shoe 53 mounted on its free end for sliding in sliding-shoe channel 8.

It is understood that numerous modifications are possible within the scope of the invention. For example, if desired, the connection between the sliding cover and the shield can be eliminated in the forward part of the shield (screws 30), so that the shield can be moved when the sliding cover is adjusted only by means of gutter 13, arm 16, and sliding-shoe support 18. However, if, as in the manner described, the shield is connected on the one hand directly with sliding cover 4 and on the other hand with gutter 13, an additional direct connection can be eliminated between the sliding cover and the gutter. Legs 15 of shield 14, if desired, can also be suspended directly in gutter 13. Locking nose 21, if desired, can be designed so that it rests upon tracks 7 with a certain amount of pretensioning in order to ensure that any inadvertent displacement of the sliding headlining will be prevented, even with the sliding headlining in any intermediate position. In order further to reduce buckling forces which may be exerted on the shield when the sliding cover is tilted, the surfaces of flange 28 and head 29 of plastic part 27, which face one another, can be rounded off in the manner shown in FIG. 6.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Sliding roof assembly for motor vehicles comprising a translucent, rigid sliding cover, said cover closing a roof opening of a fixed roof part in its closed position and being lowerable down and out of the latter and being slidable behind a rear roof part to an open position, lateral tracks mounted on the fixed roof part to guide the sliding cover, and approximately U-shaped shield, running along the lateral edges and forward edge of the sliding cover, and being displaceable together with the sliding cover, and a sliding headlining, said sliding headlining being slidable independently of said sliding cover and covering the sliding cover in its closed state, wherein lateral legs of the U-shaped shield, together with at least a portion of an upper surface of said lateral tracks delimit guide channels for lateral edges of said sliding headlining.

2. Sliding roof assembly according to claim 1, wherein the sliding headlining is provided with laterally positioned, upwardly projecting rub rails, which are applicable against lateral legs of said shield, for providing lateral guidance for the sliding headlining.

3. Sliding roof assembly according to claims 1 or 2, wherein the lateral edges of the sliding headlining are provided with a flexible coating.

4. Sliding roof assembly according to claim 3, wherein a flocked strip is applied as said coating on the lateral edges of the sliding headlining.

5. Sliding roof assembly according to claim 1 or 2, wherein downwardly directed projections are provided at the rear of said head-lining, said projections engaging lateral cable channels.

6. Sliding roof assembly according to claim 5, wherein said projections are formed by spring-loaded parts which are fastened by clips to the sliding headlining.

7. Sliding roof assembly according to claim 5, characterized by the fact that said projections on the sliding headlining are locked under spring tension into the cable channels through a slot in the cable channels which is open at the top, and by the fact that parts of the projections rest in a sliding fashion against upper limiting walls of the cable channels.

8. Sliding roof assembly according to claim 1 or 2, wherein the sliding headlining is provided at its rear end on both sides with sliding angle arms, one on each side, said angle arms being guided in a sliding shoe channel formed by said tracks.

9. Sliding roof assembly according to claim 5, wherein the sliding headlining is provided at its rear end on both sides with sliding angle arms, one on each side, said angle arms being guided in a sliding shoe channel formed by said tracks.

10. Sliding roof according to claim 5, comprising a locking arrangement for releasable holding of said sliding headlining at least in the closed position and the fully opened position of the sliding head-lining.

11. Sliding roof assembly according to claim 10, wherein said projections are attached to a part of said locking arrangement carried by said headlining.

12. Sliding roof according to claim 1, wherein said U-shaped shield is connected with the sliding headlining at at least one of front and rear ends of its lateral legs.

13. Sliding roof according to claim 12, comprising mounting arms located at the rear ends of the lateral legs of the U-shaped shield, said mounting arms being releasably connected with a gutter that participates in the sliding movements of the sliding cover.

14. Sliding roof according to claim 13, wherein the rear ends of the lateral legs of said U-shaped shield are protected against lateral deflection at the gutter.

* * * * *